United States Patent
Khan et al.

(10) Patent No.: US 10,329,823 B2
(45) Date of Patent: Jun. 25, 2019

(54) ANTI-PINCH CONTROL SYSTEM FOR POWERED VEHICLE DOORS

(71) Applicant: Ford Global Technologies, LLC, Dearborn, MI (US)

(72) Inventors: Muhammad Omer Khan, Ypsilanti, MI (US); Kosta Papanikolaou, Huntington Woods, MI (US); Christopher Matthew Radjewski, Macomb, MI (US); H. Paul Tsvi Linden, Southfield, MI (US); George Anthony Bernwanger, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 15/245,622

(22) Filed: Aug. 24, 2016

(65) Prior Publication Data
US 2018/0058128 A1    Mar. 1, 2018

(51) Int. Cl.
*B60J 1/08*    (2006.01)
*E05F 15/42*    (2015.01)
(Continued)

(52) U.S. Cl.
CPC .............. *E05F 15/42* (2015.01); *B60J 5/047* (2013.01); *E05F 5/00* (2013.01); *E05F 15/44* (2015.01);
(Continued)

(58) Field of Classification Search
CPC ......... E05Y 2900/531; E05Y 2201/246; E05Y 2201/434; E05F 15/646; B60J 5/06
(Continued)

(56) References Cited

U.S. PATENT DOCUMENTS 2,229,909 A    1/1941 Wread
3,479,767 A    11/1969 Gardner et al.
(Continued)

FOREIGN PATENT DOCUMENTS

CN    1232936 C    12/2005
CN    201198681 Y    2/2009
(Continued)

OTHER PUBLICATIONS

Zipcar.com, "Car Sharing from Zipcar: How Does car Sharing Work?" Feb. 9, 2016, 6 pages.
(Continued)

*Primary Examiner* — Kiran B Patel
(74) *Attorney, Agent, or Firm* — Vichit Chea; Price Heneveld LLP

(57) ABSTRACT

A vehicle includes a body and front and rear doors having front and rear powered latches, front and rear anti-pinch sensors, and front and rear electrically-powered door openers. The vehicle further includes a controller that is configured to receive an unlatch signal from unlatch sensors/switches and generate a signal to unlatch the front and rear powered latches and actuate the front and rear door openers after the front and rear powered latches are unlatched. The controller may also be configured to actuate the rear door opener to retain the rear door in an open position when the front pinch sensor detects a hand to thereby prevent pinching.

10 Claims, 12 Drawing Sheets

(51) Int. Cl.
| | |
|---|---|
| *E05F 15/60* | (2015.01) |
| *B60J 5/04* | (2006.01) |
| *E05F 5/00* | (2017.01) |
| *E05F 15/44* | (2015.01) |
| *E05F 15/46* | (2015.01) |
| *E05F 15/611* | (2015.01) |
| *E05F 15/43* | (2015.01) |

(52) U.S. Cl.
CPC ............. *E05F 15/46* (2015.01); *E05F 15/60* (2015.01); *E05F 15/611* (2015.01); *E05F 15/43* (2015.01); *E05Y 2201/22* (2013.01); *E05Y 2201/232* (2013.01); *E05Y 2201/40* (2013.01); *E05Y 2201/426* (2013.01); *E05Y 2400/20* (2013.01); *E05Y 2400/44* (2013.01); *E05Y 2400/54* (2013.01); *E05Y 2800/41* (2013.01); *E05Y 2900/531* (2013.01)

(58) Field of Classification Search
USPC ....................... 296/146.1, 146.4; 49/280, 360
See application file for complete search history.

(56) References Cited

U.S. PATENT DOCUMENTS

| | | | |
|---|---|---|---|
| 3,751,718 | A | 8/1973 | Hanchett |
| 3,854,310 | A | 12/1974 | Paull |
| 3,858,922 | A | 1/1975 | Yamanaka |
| 4,193,619 | A | 3/1980 | Jeril |
| 4,206,491 | A | 6/1980 | Ligman et al. |
| 4,425,597 | A | 1/1984 | Schramm |
| 4,457,148 | A | 7/1984 | Johansson et al. |
| 4,640,050 | A | 2/1987 | Yamagishi et al. |
| 4,672,348 | A | 6/1987 | Duve |
| 4,674,230 | A | 6/1987 | Takeo et al. |
| 4,674,781 | A | 6/1987 | Reece et al. |
| 4,702,117 | A | 10/1987 | Tsutsumi et al. |
| 4,848,031 | A | 6/1989 | Yamagishi et al. |
| 4,858,971 | A | 8/1989 | Haag |
| 4,889,373 | A | 12/1989 | Ward et al. |
| 4,929,007 | A | 5/1990 | Bartczak et al. |
| 5,018,057 | A | 5/1991 | Biggs et al. |
| 5,056,343 | A | 10/1991 | Kleefeldt et al. |
| 5,058,258 | A | 10/1991 | Harvey |
| 5,074,073 | A | 12/1991 | Zwebner |
| 5,173,991 | A | 12/1992 | Carswell |
| 5,239,779 | A | 8/1993 | Deland et al. |
| 5,263,762 | A | 11/1993 | Long et al. |
| 5,297,010 | A | 3/1994 | Camarota et al. |
| 5,332,273 | A | 7/1994 | Komachi |
| 5,334,969 | A | 8/1994 | Abe et al. |
| 5,494,322 | A | 2/1996 | Menke |
| 5,497,641 | A | 3/1996 | Linde et al. |
| 5,535,608 | A | 7/1996 | Brin |
| 5,547,208 | A | 8/1996 | Chappell et al. |
| 5,581,230 | A | 12/1996 | Barrett |
| 5,583,405 | A | 12/1996 | Sai et al. |
| 5,618,068 | A | 4/1997 | Mitsui et al. |
| 5,632,120 | A | 5/1997 | Shigematsu et al. |
| 5,632,515 | A | 5/1997 | Dowling |
| 5,644,869 | A | 7/1997 | Buchanan, Jr. |
| 5,653,484 | A | 8/1997 | Brackmann et al. |
| 5,662,369 | A | 9/1997 | Tsuge |
| 5,684,470 | A | 11/1997 | Deland et al. |
| 5,744,874 | A | 4/1998 | Yoshida et al. |
| 5,755,059 | A | 5/1998 | Schap |
| 5,783,994 | A | 7/1998 | Koopman, Jr. et al. |
| 5,802,894 | A | 9/1998 | Jahrsetz et al. |
| 5,808,555 | A | 9/1998 | Bartel |
| 5,852,944 | A | 12/1998 | Collard, Jr. et al. |
| 5,859,417 | A | 1/1999 | David |
| 5,896,026 | A | 4/1999 | Higgins |
| 5,896,768 | A | 4/1999 | Cranick et al. |
| 5,901,991 | A | 5/1999 | Hugel et al. |
| 5,921,612 | A | 7/1999 | Mizuki et al. |
| 5,927,794 | A | 7/1999 | Mobius |
| 5,964,487 | A | 10/1999 | Shamblin |
| 5,979,754 | A | 11/1999 | Martin et al. |
| 5,992,194 | A | 11/1999 | Baukholt et al. |
| 6,000,257 | A | 12/1999 | Thomas |
| 6,027,148 | A | 2/2000 | Shoemaker |
| 6,038,895 | A | 3/2000 | Menke et al. |
| 6,042,159 | A | 3/2000 | Spitzley et al. |
| 6,043,735 | A | 3/2000 | Barrett |
| 6,050,117 | A | 4/2000 | Weyerstall |
| 6,056,076 | A | 5/2000 | Bartel et al. |
| 6,065,316 | A | 5/2000 | Sato et al. |
| 6,072,403 | A | 6/2000 | Iwasaki et al. |
| 6,075,294 | A | 6/2000 | Van den Boom et al. |
| 6,089,626 | A | 7/2000 | Shoemaker |
| 6,091,162 | A | 7/2000 | Williams, Jr. et al. |
| 6,099,048 | A | 8/2000 | Salmon et al. |
| 6,125,583 | A | 10/2000 | Murray et al. |
| 6,130,614 | A | 10/2000 | Miller |
| 6,145,918 | A | 11/2000 | Wilbanks, II |
| 6,157,090 | A | 12/2000 | Vogel |
| 6,181,024 | B1 | 1/2001 | Geil |
| 6,198,995 | B1 | 3/2001 | Settles et al. |
| 6,241,294 | B1 | 6/2001 | Young et al. |
| 6,247,343 | B1 | 6/2001 | Weiss et al. |
| 6,256,932 | B1 | 7/2001 | Jyawook et al. |
| 6,271,745 | B1 | 8/2001 | Anazi et al. |
| 6,305,737 | B1 | 10/2001 | Corder et al. |
| 6,341,448 | B1 | 1/2002 | Murray |
| 6,361,091 | B1 | 3/2002 | Weschler |
| 6,405,485 | B1 | 6/2002 | Itami et al. |
| 6,441,512 | B1 | 8/2002 | Jakel et al. |
| 6,460,905 | B2 | 10/2002 | Suss |
| 6,470,719 | B1 | 10/2002 | Franz et al. |
| 6,480,098 | B2 | 11/2002 | Flick |
| 6,481,056 | B1 | 11/2002 | Jesse |
| 6,515,377 | B1 | 2/2003 | Uberlein et al. |
| 6,523,376 | B2 | 2/2003 | Baukholt et al. |
| 6,550,826 | B2 | 4/2003 | Fukushima et al. |
| 6,554,328 | B2 | 4/2003 | Cetnar et al. |
| 6,556,900 | B1 | 4/2003 | Brynielsson |
| 6,602,077 | B2 | 8/2003 | Kasper et al. |
| 6,606,492 | B1 | 8/2003 | Losey |
| 6,629,711 | B1 | 10/2003 | Gleason et al. |
| 6,639,161 | B2 | 10/2003 | Meagher et al. |
| 6,657,537 | B1 | 12/2003 | Hauler |
| 6,659,515 | B2 | 12/2003 | Raymond et al. |
| 6,701,671 | B1 | 3/2004 | Fukumoto et al. |
| 6,712,409 | B2 | 3/2004 | Monig |
| 6,715,806 | B2 | 4/2004 | Arlt et al. |
| 6,734,578 | B2 | 5/2004 | Konno et al. |
| 6,740,834 | B2 | 5/2004 | Sueyoshi et al. |
| 6,768,413 | B1 | 7/2004 | Kemmann et al. |
| 6,779,372 | B2 | 8/2004 | Arlt et al. |
| 6,783,167 | B2 | 8/2004 | Bingle et al. |
| 6,786,070 | B1 | 9/2004 | Dimig et al. |
| 6,794,837 | B1 | 9/2004 | Whinnery et al. |
| 6,825,752 | B2 | 11/2004 | Nahata et al. |
| 6,829,357 | B1 | 12/2004 | Alrabady et al. |
| 6,843,085 | B2 | 1/2005 | Dimig |
| 6,854,870 | B2 | 2/2005 | Huizenga |
| 6,879,058 | B2 | 4/2005 | Lorenz et al. |
| 6,883,836 | B2 | 4/2005 | Breay et al. |
| 6,883,839 | B2 | 4/2005 | Belmond et al. |
| 6,914,346 | B2 | 7/2005 | Girard |
| 6,923,479 | B2 | 8/2005 | Aiyama et al. |
| 6,933,655 | B2 | 8/2005 | Morrison et al. |
| 6,948,978 | B2 | 9/2005 | Schofield |
| 7,005,959 | B2 | 2/2006 | Amagasa |
| 7,038,414 | B2 | 5/2006 | Daniels et al. |
| 7,055,997 | B2 | 6/2006 | Baek |
| 7,062,945 | B2 | 6/2006 | Saitoh et al. |
| 7,070,018 | B2 | 7/2006 | Kachouh |
| 7,070,213 | B2 | 7/2006 | Willats et al. |
| 7,090,285 | B2 | 8/2006 | Markevich et al. |
| 7,091,823 | B2 | 8/2006 | Ieda et al. |
| 7,091,836 | B2 | 8/2006 | Kachouh et al. |
| 7,097,226 | B2 | 8/2006 | Bingle et al. |

(56) References Cited

U.S. PATENT DOCUMENTS

| | | |
|---|---|---|
| 7,106,171 B1 | 9/2006 | Burgess |
| 7,108,301 B2 | 9/2006 | Louvel |
| 7,126,453 B2 | 10/2006 | Sandau et al. |
| 7,145,436 B2 | 12/2006 | Ichikawa et al. |
| 7,161,152 B2 | 1/2007 | Dipoala |
| 7,170,253 B2 | 1/2007 | Spurr et al. |
| 7,173,346 B2 | 2/2007 | Aiyama et al. |
| 7,176,810 B2 | 2/2007 | Inoue |
| 7,180,400 B2 | 2/2007 | Amagasa |
| 7,192,076 B2 | 3/2007 | Ottino |
| 7,204,530 B2 | 4/2007 | Lee |
| 7,205,777 B2 | 4/2007 | Schultz et al. |
| 7,221,255 B2 | 5/2007 | Johnson et al. |
| 7,222,459 B2 | 5/2007 | Taniyama |
| 7,248,955 B2 | 7/2007 | Hein et al. |
| 7,263,416 B2 | 8/2007 | Sakurai et al. |
| 7,270,029 B1 | 9/2007 | Papanikolaou et al. |
| 7,325,843 B2 | 2/2008 | Coleman et al. |
| 7,342,373 B2 | 3/2008 | Newman et al. |
| 7,360,803 B2 | 4/2008 | Parent et al. |
| 7,363,788 B2 | 4/2008 | Dimig et al. |
| 7,375,299 B1 | 5/2008 | Pudney |
| 7,399,010 B2 | 7/2008 | Hunt et al. |
| 7,446,656 B2 | 11/2008 | Steegmann |
| 7,576,631 B1 | 8/2009 | Bingle et al. |
| 7,642,669 B2 | 1/2010 | Spurr |
| 7,686,378 B2 | 3/2010 | Gisler et al. |
| 7,688,179 B2 | 3/2010 | Kurpinski et al. |
| 7,705,722 B2 | 4/2010 | Shoemaker et al. |
| 7,747,286 B2 | 6/2010 | Conforti |
| 7,780,207 B2 | 8/2010 | Gotou et al. |
| 7,791,218 B2 | 9/2010 | Mekky et al. |
| 7,926,385 B2 | 4/2011 | Papanikolaou et al. |
| 7,931,314 B2 | 4/2011 | Nitawaki et al. |
| 7,937,893 B2 | 5/2011 | Pribisic |
| 8,028,375 B2 | 10/2011 | Nakaura et al. |
| 8,093,987 B2 | 1/2012 | Kurpinski et al. |
| 8,126,450 B2 | 2/2012 | Howarter et al. |
| 8,141,296 B2 | 3/2012 | Bem |
| 8,141,916 B2 | 3/2012 | Tomaszewski et al. |
| 8,169,317 B2 | 5/2012 | Lemerand et al. |
| 8,193,462 B2 | 6/2012 | Zanini et al. |
| 8,224,313 B2 | 7/2012 | Howarter et al. |
| 8,376,416 B2 | 2/2013 | Arabia, Jr. et al. |
| 8,398,128 B2 | 3/2013 | Arabia et al. |
| 8,405,515 B2 | 3/2013 | Ishihara et al. |
| 8,419,114 B2 | 4/2013 | Fannon |
| 8,451,087 B2 | 5/2013 | Krishnan et al. |
| 8,454,062 B2 | 6/2013 | Rohlfing et al. |
| 8,474,889 B2 | 7/2013 | Reifenberg et al. |
| 8,532,873 B1 | 9/2013 | Bambenek |
| 8,534,101 B2 | 9/2013 | Mette et al. |
| 8,544,901 B2 | 10/2013 | Krishnan et al. |
| 8,573,657 B2 | 11/2013 | Papanikolaou et al. |
| 8,601,903 B1 | 12/2013 | Klein et al. |
| 8,616,595 B2 | 12/2013 | Wellborn, Sr. et al. |
| 8,648,689 B2 | 2/2014 | Hathaway et al. |
| 8,690,204 B2 | 4/2014 | Lang et al. |
| 8,746,755 B2 | 6/2014 | Papanikolaou et al. |
| 8,826,596 B2 | 9/2014 | Tensing |
| 8,833,811 B2 | 9/2014 | Ishikawa |
| 8,903,605 B2 | 12/2014 | Bambenek |
| 8,915,524 B2 | 12/2014 | Charnesky |
| 8,963,701 B2 | 2/2015 | Rodriguez |
| 8,965,287 B2 | 2/2015 | Lam |
| 9,076,274 B2 | 7/2015 | Kamiya |
| 9,159,219 B2 | 10/2015 | Magner et al. |
| 9,184,777 B2 | 11/2015 | Esselink et al. |
| 9,187,012 B2 | 11/2015 | Sachs et al. |
| 9,189,900 B1 | 11/2015 | Penilla et al. |
| 9,260,882 B2 | 2/2016 | Krishnan et al. |
| 9,284,757 B2 | 3/2016 | Kempel |
| 9,405,120 B2 | 8/2016 | Graf |
| 9,409,579 B2 | 8/2016 | Eichin et al. |
| 9,416,565 B2 | 8/2016 | Papanikolaou et al. |
| 9,518,408 B1 | 12/2016 | Krishnan |
| 9,546,502 B2 | 1/2017 | Lange |
| 9,551,166 B2 | 1/2017 | Patel et al. |
| 9,725,069 B2 | 8/2017 | Krishnan |
| 9,777,528 B2 | 10/2017 | Elie et al. |
| 9,797,178 B2 | 10/2017 | Elie et al. |
| 9,797,181 B2 | 10/2017 | Wheeler et al. |
| 9,834,964 B2 | 12/2017 | Van Wiemeersch et al. |
| 9,845,071 B1 | 12/2017 | Krishnan |
| 9,903,142 B2 | 2/2018 | Van Wiemeersch et al. |
| 9,909,344 B2 | 3/2018 | Krishnan et al. |
| 9,957,737 B2 | 5/2018 | Patel et al. |
| 2001/0005078 A1 | 6/2001 | Fukushima et al. |
| 2001/0030871 A1 | 10/2001 | Anderson |
| 2002/0000726 A1 | 1/2002 | Zintler |
| 2002/0111844 A1 | 8/2002 | Vanstory et al. |
| 2002/0121967 A1 | 9/2002 | Bowen et al. |
| 2002/0186144 A1 | 12/2002 | Meunier |
| 2003/0009855 A1 | 1/2003 | Budzynski |
| 2003/0025337 A1 | 2/2003 | Suzuki et al. |
| 2003/0038544 A1 | 2/2003 | Spurr |
| 2003/0101781 A1 | 6/2003 | Budzynski et al. |
| 2003/0107473 A1 | 6/2003 | Pang et al. |
| 2003/0111863 A1 | 6/2003 | Weyerstall et al. |
| 2003/0139155 A1 | 7/2003 | Sakai |
| 2003/0172695 A1 | 9/2003 | Buschmann |
| 2003/0182863 A1 | 10/2003 | Mejean et al. |
| 2003/0184098 A1 | 10/2003 | Aiyama |
| 2003/0216817 A1 | 11/2003 | Pudney |
| 2004/0061462 A1 | 4/2004 | Bent et al. |
| 2004/0093155 A1 | 5/2004 | Simonds et al. |
| 2004/0124708 A1 | 7/2004 | Giehler et al. |
| 2004/0195845 A1 | 10/2004 | Chevalier |
| 2004/0217601 A1 | 11/2004 | Gamault et al. |
| 2005/0057047 A1 | 3/2005 | Kachouch |
| 2005/0068712 A1 | 3/2005 | Schulz et al. |
| 2005/0173886 A1* | 8/2005 | Leitner ............ B60R 3/02 280/166 |
| 2005/0216133 A1 | 9/2005 | MacDougall et al. |
| 2005/0218913 A1 | 10/2005 | Inaba |
| 2006/0056663 A1 | 3/2006 | Call |
| 2006/0100002 A1 | 5/2006 | Luebke et al. |
| 2006/0186987 A1 | 8/2006 | Wilkins |
| 2007/0001467 A1 | 1/2007 | Muller et al. |
| 2007/0089527 A1* | 4/2007 | Shank ............ B60N 2/002 73/780 |
| 2007/0090654 A1 | 4/2007 | Eaton |
| 2007/0115191 A1 | 5/2007 | Hashiguchi et al. |
| 2007/0120645 A1 | 5/2007 | Nakashima |
| 2007/0126243 A1 | 6/2007 | Papanikolaou et al. |
| 2007/0132553 A1 | 6/2007 | Nakashima |
| 2007/0170727 A1 | 7/2007 | Kohlstrand et al. |
| 2008/0021619 A1 | 1/2008 | Steegmann et al. |
| 2008/0060393 A1 | 3/2008 | Johansson et al. |
| 2008/0068129 A1 | 3/2008 | Ieda et al. |
| 2008/0129446 A1 | 6/2008 | Vader |
| 2008/0143139 A1 | 6/2008 | Bauer et al. |
| 2008/0202912 A1 | 8/2008 | Boddie et al. |
| 2008/0203737 A1 | 8/2008 | Tomaszewski et al. |
| 2008/0211623 A1 | 9/2008 | Scheurich |
| 2008/0217956 A1 | 9/2008 | Gschweng et al. |
| 2008/0224482 A1 | 9/2008 | Cumbo et al. |
| 2008/0230006 A1 | 9/2008 | Kirchoff et al. |
| 2008/0250718 A1 | 10/2008 | Papanikolaou et al. |
| 2008/0296927 A1* | 12/2008 | Gisler ............ E05F 15/43 296/146.4 |
| 2008/0303291 A1 | 12/2008 | Spurr |
| 2008/0307711 A1 | 12/2008 | Kern et al. |
| 2009/0033104 A1 | 2/2009 | Konchan et al. |
| 2009/0033477 A1 | 2/2009 | Illium et al. |
| 2009/0145181 A1 | 6/2009 | Pecoul et al. |
| 2009/0146668 A1* | 6/2009 | Wuerstlein ............ B60N 2/0244 324/663 |
| 2009/0146827 A1* | 6/2009 | Wuerstlein ............ H03K 17/955 340/657 |
| 2009/0160211 A1 | 6/2009 | Kirshnan et al. |
| 2009/0177336 A1 | 7/2009 | McClellan et al. |
| 2009/0240400 A1 | 9/2009 | Lachapelle et al. |

(56) References Cited

U.S. PATENT DOCUMENTS

| | | | |
|---|---|---|---|
| 2009/0256578 A1* | 10/2009 | Wuerstlein | G01D 5/2405 324/601 |
| 2009/0257241 A1 | 10/2009 | Meinke et al. | |
| 2010/0007463 A1 | 1/2010 | Dingman et al. | |
| 2010/0005233 A1 | 3/2010 | Arabia et al. | |
| 2010/0050787 A1* | 3/2010 | Abert | H03K 17/955 73/862.626 |
| 2010/0052337 A1 | 3/2010 | Arabia, Jr. et al. | |
| 2010/0060505 A1 | 3/2010 | Witkowski | |
| 2010/0097186 A1 | 4/2010 | Wielebski | |
| 2010/0156440 A1* | 6/2010 | Weingartner | E05F 15/46 324/658 |
| 2010/0175945 A1 | 7/2010 | Helms | |
| 2010/0235057 A1 | 9/2010 | Papanikolaou et al. | |
| 2010/0235058 A1 | 9/2010 | Papanikolaou et al. | |
| 2010/0235059 A1 | 9/2010 | Krishnan et al. | |
| 2010/0237635 A1 | 9/2010 | Ieda et al. | |
| 2010/0253535 A1 | 10/2010 | Thomas | |
| 2010/0265034 A1 | 10/2010 | Cap et al. | |
| 2010/0315267 A1 | 12/2010 | Chung et al. | |
| 2011/0041409 A1 | 2/2011 | Newman et al. | |
| 2011/0060480 A1 | 3/2011 | Mottla et al. | |
| 2011/0148575 A1 | 6/2011 | Sobecki et al. | |
| 2011/0154740 A1 | 6/2011 | Matsumoto et al. | |
| 2011/0180350 A1 | 7/2011 | Thacker | |
| 2011/0203181 A1 | 8/2011 | Magner et al. | |
| 2011/0203336 A1 | 8/2011 | Mette et al. | |
| 2011/0227351 A1 | 9/2011 | Grosedemouge | |
| 2011/0248862 A1 | 10/2011 | Budampati | |
| 2011/0252845 A1 | 10/2011 | Webb et al. | |
| 2011/0259661 A1* | 10/2011 | Thiele | G01D 11/245 180/271 |
| 2011/0313937 A1 | 12/2011 | Moore, Jr. et al. | |
| 2012/0119524 A1 | 5/2012 | Bingle et al. | |
| 2012/0154292 A1 | 6/2012 | Zhao et al. | |
| 2012/0180394 A1 | 7/2012 | Shinohara | |
| 2012/0192489 A1* | 8/2012 | Pribisic | G01V 3/088 49/28 |
| 2012/0205925 A1 | 8/2012 | Muller et al. | |
| 2012/0228886 A1 | 9/2012 | Muller et al. | |
| 2012/0252402 A1 | 10/2012 | Jung | |
| 2013/0069761 A1 | 3/2013 | Tieman | |
| 2013/0079984 A1 | 3/2013 | Aerts et al. | |
| 2013/0104459 A1 | 5/2013 | Patel et al. | |
| 2013/0127180 A1 | 5/2013 | Heberer et al. | |
| 2013/0138303 A1 | 5/2013 | McKee et al. | |
| 2013/0207794 A1 | 8/2013 | Patel | |
| 2013/0282226 A1 | 10/2013 | Pollmann | |
| 2013/0295913 A1 | 11/2013 | Matthews, III et al. | |
| 2013/0311046 A1 | 11/2013 | Heberer et al. | |
| 2013/0321065 A1 | 12/2013 | Salter et al. | |
| 2013/0325521 A1 | 12/2013 | Jameel | |
| 2014/0000165 A1 | 1/2014 | Patel et al. | |
| 2014/0007404 A1 | 1/2014 | Krishnan et al. | |
| 2014/0015637 A1 | 1/2014 | Dassanakake et al. | |
| 2014/0088825 A1 | 3/2014 | Lange et al. | |
| 2014/0129113 A1 | 5/2014 | Van Wiemersch et al. | |
| 2014/0150581 A1 | 6/2014 | Scheuring et al. | |
| 2014/0156111 A1 | 6/2014 | Ehrman | |
| 2014/0188999 A1 | 7/2014 | Leonard et al. | |
| 2014/0200774 A1 | 7/2014 | Lange et al. | |
| 2014/0227980 A1 | 8/2014 | Esselink et al. | |
| 2014/0242971 A1 | 8/2014 | Aladenize et al. | |
| 2014/0245666 A1 | 9/2014 | Ishida et al. | |
| 2014/0256304 A1 | 9/2014 | Frye et al. | |
| 2014/0278599 A1 | 9/2014 | Reh | |
| 2014/0293753 A1 | 10/2014 | Pearson | |
| 2014/0338409 A1 | 11/2014 | Kraus et al. | |
| 2014/0347163 A1 | 11/2014 | Banter et al. | |
| 2015/0001926 A1 | 1/2015 | Kageyama et al. | |
| 2015/0048927 A1 | 2/2015 | Simmons | |
| 2015/0059250 A1 | 3/2015 | Miu et al. | |
| 2015/0084739 A1 | 3/2015 | Lemoult et al. | |
| 2015/0149042 A1 | 5/2015 | Cooper et al. | |
| 2015/0161832 A1 | 6/2015 | Esselink et al. | |
| 2015/0197205 A1 | 7/2015 | Xiong | |
| 2015/0240548 A1 | 8/2015 | Bendel et al. | |
| 2015/0294518 A1 | 10/2015 | Peplin | |
| 2015/0330112 A1 | 11/2015 | Van Wiemeersch et al. | |
| 2015/0330113 A1 | 11/2015 | Van Wiemeersch et al. | |
| 2015/0330114 A1 | 11/2015 | Linden et al. | |
| 2015/0330117 A1 | 11/2015 | Van Wiemeersch et al. | |
| 2015/0330133 A1 | 11/2015 | Konchan et al. | |
| 2015/0360545 A1 | 12/2015 | Nanla | |
| 2015/0371031 A1 | 12/2015 | Ueno et al. | |
| 2016/0060909 A1 | 3/2016 | Krishnan et al. | |
| 2016/0130843 A1 | 5/2016 | Bingle | |
| 2016/0138306 A1 | 5/2016 | Krishnan et al. | |
| 2016/0153216 A1 | 6/2016 | Funahashi et al. | |
| 2016/0273255 A1 | 9/2016 | Suzuki et al. | |
| 2016/0326779 A1 | 11/2016 | Papanikolaou et al. | |
| 2017/0014039 A1 | 1/2017 | Pahlevan et al. | |
| 2017/0022742 A1 | 1/2017 | Seki et al. | |
| 2017/0058588 A1 | 3/2017 | Wheeler et al. | |
| 2017/0074006 A1 | 3/2017 | Patel et al. | |
| 2017/0247016 A1 | 8/2017 | Krishnan | |
| 2017/0270490 A1 | 9/2017 | Penilla et al. | |
| 2017/0306662 A1 | 10/2017 | Och et al. | |
| 2017/0349146 A1 | 12/2017 | Krishnan | |
| 2018/0038146 A1* | 2/2018 | Linden | E05B 81/20 |
| 2018/0038147 A1 | 2/2018 | Linden et al. | |
| 2018/0051493 A1 | 2/2018 | Krishnan et al. | |
| 2018/0051498 A1 | 2/2018 | Van Wiemeersch et al. | |
| 2018/0058128 A1 | 3/2018 | Khan et al. | |
| 2018/0065598 A1 | 3/2018 | Krishnan | |
| 2018/0080270 A1* | 3/2018 | Khan | E05F 15/611 |
| 2018/0128022 A1 | 5/2018 | Van Wiemersh et al. | |

FOREIGN PATENT DOCUMENTS

| | | |
|---|---|---|
| CN | 101527061 A | 9/2009 |
| CN | 201567872 U | 9/2010 |
| CN | 101932466 A | 12/2010 |
| CN | 201915717 U | 8/2011 |
| CN | 202200933 U | 4/2012 |
| CN | 202686247 U | 1/2013 |
| CN | 103206117 A | 7/2013 |
| CN | 103264667 A | 8/2013 |
| CN | 203511548 U | 4/2014 |
| CN | 204326814 U | 5/2015 |
| DE | 4403655 A1 | 8/1995 |
| DE | 19620059 A1 | 11/1997 |
| DE | 19642698 A1 | 4/1998 |
| DE | 19642698 A2 | 11/2000 |
| DE | 10212794 A1 | 6/2003 |
| DE | 20121915 U1 | 11/2003 |
| DE | 10309821 A1 | 9/2004 |
| DE | 1020050415541 A1 | 3/2007 |
| DE | 102006029774 A1 | 1/2008 |
| DE | 102006040211 A1 | 3/2008 |
| DE | 102006041928 A1 | 3/2008 |
| DE | 102010052582 A1 | 5/2012 |
| DE | 102011051165 A1 | 12/2012 |
| DE | 102015101164 A1 | 7/2015 |
| DE | 102014107809 A1 | 12/2015 |
| EP | 0372791 A2 | 6/1990 |
| EP | 0694664 A1 | 1/1996 |
| EP | 1162332 A1 | 12/2001 |
| EP | 1284334 A1 | 2/2003 |
| EP | 1288403 A2 | 3/2003 |
| EP | 1284334 A1 | 9/2003 |
| EP | 1460204 A2 | 9/2004 |
| EP | 1465119 A1 | 10/2004 |
| EP | 1338731 A2 | 2/2005 |
| EP | 1944436 A2 | 7/2008 |
| EP | 2053744 A1 | 4/2009 |
| EP | 2314803 A2 | 4/2011 |
| FR | 2698838 A1 | 6/1994 |
| FR | 2783547 A1 | 3/2000 |
| FR | 2841285 A1 | 12/2003 |
| FR | 2860261 A1 | 4/2005 |
| FR | 2948402 A1 | 7/2009 |
| FR | 2955604 A1 | 7/2011 |

(56) References Cited

FOREIGN PATENT DOCUMENTS

| | | |
|---|---|---|
| GB | 2402840 A | 12/2004 |
| GB | 2496754 A | 5/2013 |
| JP | 62255256 A | 11/1987 |
| JP | 05059855 A | 3/1993 |
| JP | 406167156 A | 7/1994 |
| JP | 406185250 A | 7/1994 |
| JP | 2000064685 A | 2/2000 |
| JP | 2000314258 A | 11/2000 |
| JP | 2007100342 A | 4/2007 |
| JP | 2007138500 A | 6/2007 |
| KR | 20030025738 A | 3/2003 |
| KR | 20120108580 A | 10/2012 |
| WO | 0123695 A1 | 4/2001 |
| WO | 03095776 A1 | 11/2003 |
| WO | 2013111615 A1 | 8/2013 |
| WO | 2013146918 A1 | 10/2013 |
| WO | 2014146186 A1 | 9/2014 |
| WO | 2015064001 A1 | 5/2015 |
| WO | 2015145868 A1 | 10/2015 |
| WO | 2017160787 A2 | 9/2017 |

OTHER PUBLICATIONS

Department of Transportation, "Federal Motor Vehicle Safety Standards; Door Locks and Door Retention Components and Side Impact Protection,"http://www.nhtsa.gov/cars/rules/rulings/DoorLocks/DoorLocks_NPRM.html#VI_C, 23 pages, Aug. 28, 2010.
"Push Button to open your car door" Online video clip. YouTube, Mar. 10, 2010. 1 page.
Car of the Week: 1947 Lincoln convertible By: bearnest May 29, 2012 http://www.oldcarsweekly.com/car-of-the-week/car-of-the-week-1947-lincoln-convertible. 7 pages.
U.S. Appl. No. 14/276,415, Office Action dated Mar. 28, 2018, 19 pages.
U.S. Appl. No. 12/402,744, Office Action dated Oct. 23, 2013, 7 pages.
U.S. Appl. No. 12/402,744, Advisory Action dated Jan. 31, 2014, 2 pages.
U.S. Appl. No. 14/280,035, filed May 16, 2014, entitled "Powered Latch System for Vehicle Doors and Control System Therefor."
U.S. Appl. No. 14/281,998, filed May 20, 2014, entitled "Vehicle Door Handle and Powered Latch System."
U.S. Appl. No. 14/282,224, filed May 20, 2014, entitled "Powered Vehicle Door Latch and Exterior Handle With Sensor."
George Kennedy, "Keyfree app replaces conventional keys with your smart phone," website, Jan. 5, 2015, 2 pages.
Hyundai Motor India Limited, "Hyundai Care," website, Dec. 8, 2015, 3 pages.
Keyfree Technologies Inc., "Keyfree," website, Jan. 10, 2014, 2 pages.
PRWEB, "Keyfree Technologies Inc. Launches the First Digital Car Key," Jan. 9, 2014, 3 pages.
Kisteler Instruments, "Force Sensors Ensure Car Door Latch is Within Specification," Article, Jan. 1, 2005, 3 pages.
General Motors Corporation, 2006 Chevrolet Corvette Owner Manual, ©2005 General Motors Corporation, 4 pages.
General Motors LLC, 2013 Chevrolet Corvette Owner Manual, 2012, 17 pages.
General Motors, "Getting to Know Your 2014 Corvette," Quick Reference Guide, 2013, 16 pages.
InterRegs Ltd., Federal Motor Vehicle Safety Standard, "Door Locks and Door Retention Components," 2012, F.R. vol. 36 No. 232—Feb. 12, 1971, 23 pages.
Ross Downing, "Flow to Enter & Exit a Corvette With a Dead Battery," YouTube video http://www.youtube.com/watch?v=DLDqmGQU6L0, Jun. 6, 2011, 1 page.
Jeff Glucker, "Friends videotape man 'trapped' inside C6 Corette with dead battery," YouTube via Corvett Online video http://www.autoblog.com/2011/05/14/friends-videotape-man-trapped-inside-c6-corvette-with-dead-bat/, May 14, 2011, 1 page.
Don Roy, "ZR1 Owner Calls 911 After Locking Self in Car," website http://www.corvetteonline.com/news/zr1-owner-calls-911-after-locking-self-in-car/, Apr. 13, 2011, 2 pages.
Zach Bowman, "Corvette with dead battery traps would-be thief," website http://www.autoblog.com/2011/10/25/corvette-with-dead-battery-traps-would-be-thief/, Oct. 25, 2011, 2 pages.
U.S. Appl. No. 14/468,634, filed Aug. 26, 2014, 15 pages.
U.S. Appl. No. 13/608,303, filed Sep. 10, 2012, 15 pages.
U.S. Appl. No. 14/281,998, filed May 20, 2014, 20 pages.
U.S. Appl. No. 14/282,224, filed May 20, 2014, 15 pages.
U.S. Appl. No. 14/276,415, filed May 13, 2014, 18 pages.
Office Action dated Mar. 10, 2017, U.S. Appl. No. 15/174,206, filed Jun. 6, 2016, 17 pages.
Hyundai Bluelink, "Send Directions to your car," Link to App, 2015, 3 pages.
Bryan Laviolette, "GM's New App Turns Smartphones into Virtual Keys," Article, Jul. 22, 2010, 2 pages.

* cited by examiner

ANTI-PINCH CONTROL SYSTEM FOR POWERED VEHICLE DOORS

FIELD OF THE INVENTION

The present invention generally relates to vehicle doors, and in particular to a vehicle including one or more powered door opening mechanisms and anti-pinch sensors to prevent pinching of user's hands.

BACKGROUND OF THE INVENTION

Various types of vehicle doors and door latch mechanisms have been developed. The vehicle doors may have powered door opening mechanisms. Known vehicle doors may also include powered latches that can be actuated to permit opening a vehicle door without requiring movement of an external door handle. However, known vehicle door systems may suffer from various drawbacks.

SUMMARY OF THE INVENTION

One aspect of the present disclosure is a vehicle door system including a vehicle structure having a door opening and a door that is rotatably mounted to the vehicle structure to close off the door opening when the door is in a closed position. The vehicle door system also includes an anti-pinch sensor that is configured to detect a user's hand if a user's hand is positioned adjacent the door opening. An electrically-powered latch mechanism permits the door to open when the electrically-powered latch mechanism is unlatched. The electrically-powered latch mechanism retains the door in a closed position when the electrically-powered latch mechanism is latched. The door system further includes an electrically-powered door actuator that can be actuated to shift the door from a closed position to a partially open position. The vehicle door system further includes a controller that is configured to actuate the electrically powered door actuator to prevent the door from closing if the anti-pinch sensor detects a user's hand.

Another aspect of the present disclosure is a vehicle including a body and front and rear doors having, respectively, front and rear powered latches, front and rear pinch sensors, and front and rear electrically-powered door openers. The vehicle further includes a controller that is configured to receive an unlatch signal and unlatch the front and rear powered latches and actuate the front and rear door openers and actuate the rear door opener to retain the rear door in an open position when the front pinch sensor detects a user's hand.

Another aspect of the present disclosure is a vehicle door system including a vehicle structure having adjacent front and rear door openings. Front and rear doors are rotatably mounted to the vehicle structure to close off the front and rear door openings, respectively, when the doors are in closed positions. Front and rear anti-pinch sensors that are configured to detect user's hands adjacent the front and rear door openings, respectively. Front and rear electrically-powered latch mechanisms are configured to permit the front and rear doors, respectively, to open when the electrically-powered latch mechanisms are unlatched. The front and rear electrically-powered latch mechanisms retain the front and rear doors in closed positions when the electrically-powered latch mechanisms are latched. The vehicle door system also includes front and rear electrically-powered door actuators that can be actuated to shift the front and rear doors, respectively, from closed positions to open positions. A controller is configured to actuate at least one of the front and rear electrically-powered door actuators to prevent the at least one of the front and rear doors from closing if at least one of the front and rear anti-pinch sensors detects a user's hand.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
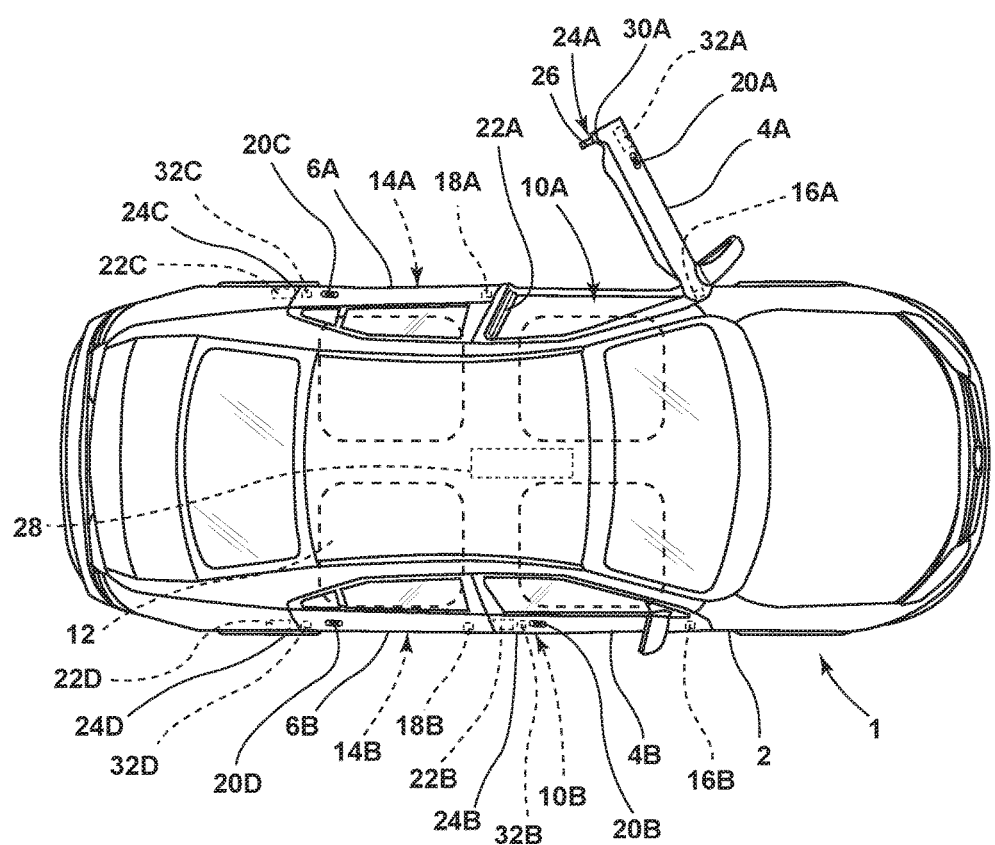
FIG. 1 is a partially schematic plan view of a vehicle including anti-pinch sensors and powered door actuators that open the vehicle doors.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes a body structure 2, front doors 4A and 4B, and rear doors 6A and 6B. The front doors 4A and 4B are configured to open and close to provide access to interior 12 of vehicle 1 through front openings 10A and 10B, respectively. Similarly, rear doors 6A and 6B are configured to open and close to provide access through rear door openings 14A and 14B. Front doors 4A and 4B are rotatably mounted to body structure 2 by hinges 16A and 16B, and rear doors 6A and 6B are rotatably mounted to body structure 2 by rear hinges 18A and 18B, respectively. As discussed in more detail below, the vehicle doors 4A, 4B, 6A and 6B may include exterior switches or sensors 20A-20B, respectively that can be actuated by a user to unlatch and open the vehicle doors. Vehicle 1 may comprise a two door vehicle having only front doors 4A and 4B, and front openings 10A and 10B.

Vehicle 1 further includes anti-pinch sensors 22A-22D that are configured to detect a user's hand if the user's hand is inserted into an opening 10A, 10B, 14A, 14B when a vehicle door is opened. Pinch sensors 22A-22D may comprise capacitive sensors, pressure sensitive sensors, or other suitable sensor capable of detecting a user's hand. Pinch sensors 22A-22D may be mounted to the body structure 2 adjacent the door openings. Vehicle door 4A also includes a powered door opener 24 that includes a plunger 26 that can be shifted to a first extended position to partially open the door 4A (see also FIG. 7). The doors 4B, 6A, and 6B may also include powered door opening mechanisms 24. The doors 4A, 4B, 6A, and 6B also include powered latch mechanisms 32A-32D. The powered latches 32A-32D can be actuated by controller 28 to unlatch the doors if unlatch switches 20A-20D, respectively, are actuated by a user. The controller 28 may be operably connected to the anti-pinch sensors 22A-22D, powered door opening mechanisms 24A-24D, and powered latches 32A-32D. Controller 28 may comprise a single central controller as shown in FIG. 1, or controller 28 may comprise separate controllers that are located in each door 4A, 4B, 6A, and 6B. The powered door opening mechanisms 24A-24D and powered latches 32A-32D are described in more detail in copending U.S. patent application Ser. No. 15/227,672, filed on Aug. 3, 2016, entitled "PRIORITY DRIVEN POWER SIDE DOOR OPEN/CLOSE OPERATIONS," the entire contents of which are incorporated herein by reference. As discussed in the above-referenced '672 patent application, powered latches 32A-32D may include a rotating claw that engages a striker on body structure 2 to retain doors 4A, 4B, 6A and 6B in closed positions. A movably pawl engages the claw to prevent rotation of the claw when powered latches 32A-32D are latched. Conversely, the pawl permits rotation of the claw when latches 32A-32D are unlatched. An electrically-powered actuator is operably connected to the pawl and shifts the pawl between engaged (latched), and disengaged (unlatched) positions when electrical power is supplied to the powered actuator by controller 28.

As discussed in more detail below, to enter vehicle 1 a user pushes release switch 20A which is operably connected to a controller or electric control unit ("ECU") 28. It will be understood that controller 28 may comprise various hardware and/or software, and the terms "controller" and "ECU" are not limited to any specific device and/or software. Controller 28 then actuates the powered door opening mechanism 24 to thereby cause the plunger 26 to shift to an extended ("first check") position to thereby at least partially open door 4A whereby rear edge 30A of door 4A is spaced apart from vehicle body 2. A user then grasps edge 30A and pulls door 4A to a fully open position. The other doors 4B, 6A, and 6B may be opened in a substantially similar manner.

The powered door opening mechanism 24 permits elimination of external vehicle door handles that would otherwise be required to permit a user to grasp the door handle to pull the door open.

Figure 2:
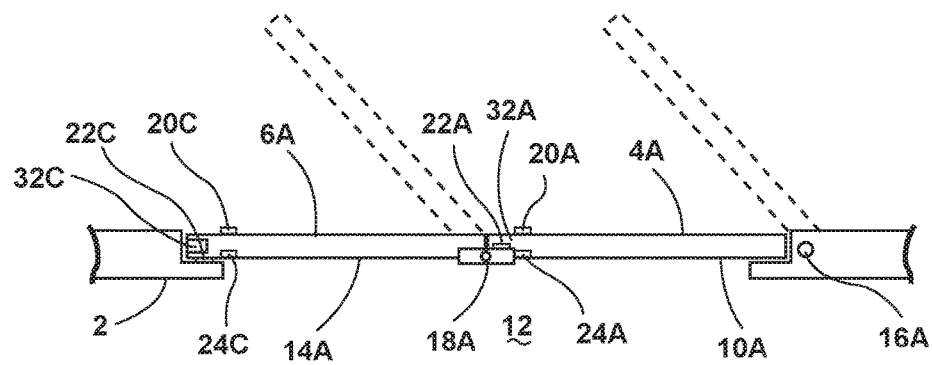
FIG. 2 is a schematic view of a portion of the vehicle of FIG. 1.
Figure 3:
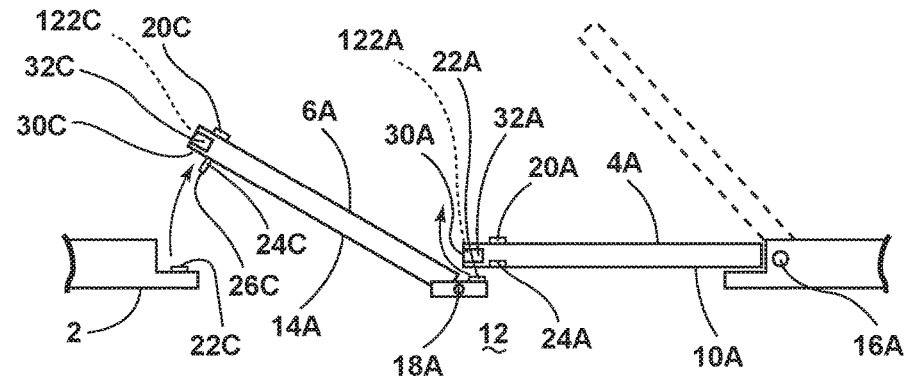
FIG. 3 is a schematic view of a portion of the vehicle of FIG. 1.

Opening and closing of the driver's side front and rear doors 4A and 6A is shown schematically in FIGS. 2 and 3. It will be understood that the passenger side doors 4B and 6B operate in a substantially similar manner as driver's side doors 4A and 6A. As discussed below in connection with FIGS. 4-8, in use, a user initially actuates a sensor or switch 20A or 20C to generate an unlatch request to controller 28. For example, if a user pushes the unlatch switch 20A, controller 28 generates a signal to powered latch 32A of front door 4A to thereby provide powered unlatching of latch 32A. Similarly, if unlatch switch 20C is actuated, controller 28 generates a signal to unlatch powered latch 32C of rear door 6A. After the powered latch is unlatched, controller 28 then generates a signal to the powered actuator 24A or 24C, causing plunger 26 to extend and push door 4A or 6A to a partially opened position. A user then grasps rear edge 30A or 30C of door 4A or 6A to pull the door to a fully open position. As a user grasps the edge 30A or 30C, anti-pinch sensors 22A or 22C generate a signal to controller 28 indicating that a user's hand is present. Controller 28 may then generate a signal to retain the plunger 26 in an extended position to prevent pinching of a user's hand.

Referring to FIG. 3, when rear door 6A is opened and front door 4A remains closed, a user may nevertheless insert a hand and grasp rear edge 30A of front door 4A even though front door 4A is in a closed position. If rear door 6A were to be closed this could pinch a user's hand positioned adjacent front pinch sensor 22A. As discussed in more detail below in connection with FIGS. 10A, 10B, 11A, 11B, 12A, 12B, 13A, and 13B, controller 28 is configured/programmed to prevent pinching if the front door 4A is closed while the rear door 6A is open as shown in FIG. 3. As shown in FIG. 3, anti-pinch sensors 122A, 122C, etc. may optionally be mounted to the vehicle doors 4A, 6A adjacent the rear edges 30A, 30C, etc.

Figures 4, 5:
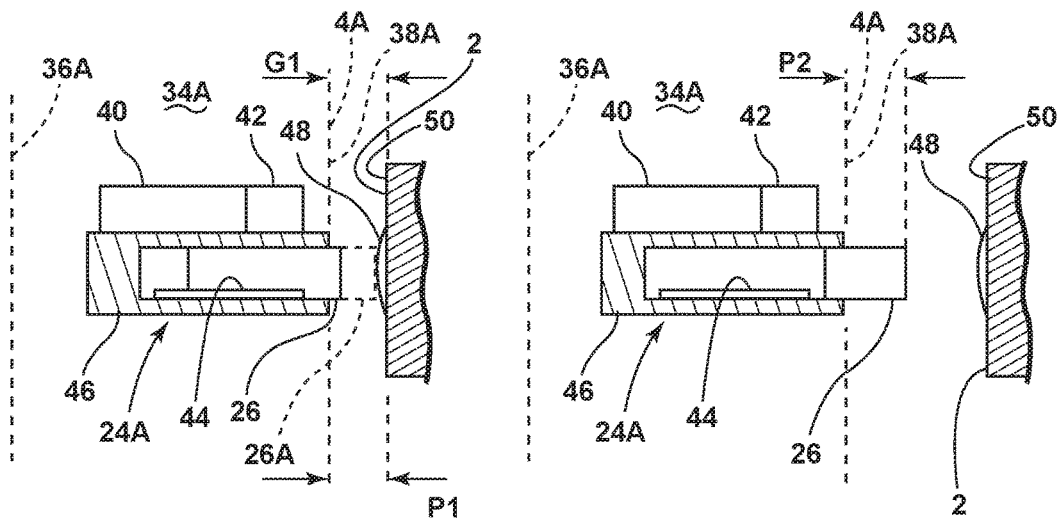
FIG. 4 is a schematic view of a powered door actuator in a first check position.
FIG. 5 is a schematic view of a powered door actuator in a second check position.

With further reference to FIGS. 4 and 5, an electrically-powered door opening mechanism 24A is disposed in an interior space 34A of door 4A between outer side 36A and inner side 38A of door 4A. All doors of the vehicle 1 may include powered door opening mechanisms that are substantially similar to the mechanism 24A. Mechanism 24A may include a housing or base structure 46 and a plunger 26 that is movably interconnected with the housing 46 for reciprocating movement relative to the housing 46. The mechanism 24A may include an electric motor 40 and gear drive 42 that provide for powered movement of plunger 26. A sensor 44 enables controller 28 to determine the position of plunger 26 relative to housing 46. The components of powered actuator 24A are shown schematically in FIGS. 4 and 5. It will be understood that the powered door opening mechanism 24A may have various configurations as required for a particular application. For example, the powered door opening mechanism 24 may be configured as disclosed in copending U.S. patent application Ser. No. 15/227,672, filed on Aug. 3, 2016, entitled "PRIORITY DRIVEN POWER SIDE DOOR OPEN/CLOSE OPERATIONS."

Plunger 26 may be actuated to extend to a first check position 26A (FIG. 4) in which plunger 26 extends a distance "P1," causing door 4A to open to a first partially open position (see also FIG. 7) whereby a gap "G1" is formed between inner surface 38A of door 4A and surface 50 of vehicle body 2. A pad or surface 48 may be disposed on surface 50 of body 2 in the region where plunger 26 contacts surface 50 of vehicle body 2. As also discussed below, the plunger 26 may be further extended to a fully extended position "P2" that is slightly greater than distance P1 as shown in FIG. 5. Plunger 26 shifts to fully extended position P2 after door 4A has been shifted to a fully open position (e.g. pulled open by a user). Controller 28 may be configured to detect travel of plunger 26 to fully extended position P2, and utilize the P2 position as an indication that the door has been shifted to a fully open position. Alternatively, door hinges 16A, 18A, etc. may include a sensor (not shown) that detects the angular positions of the doors such that controller 28 can determine when the doors are fully open. The second check position P2 and/or rotation sensors are optional, and controller 28 may be configured to operate without a sensor input indicating that a vehicle door has been fully opened. In general, the distance P1 (and gap G1) may be about one to about four inches. The second distance P2 may be, for example, 0.25 inches, 0.50 inches (or more) greater than distance P1.

Figure 6:
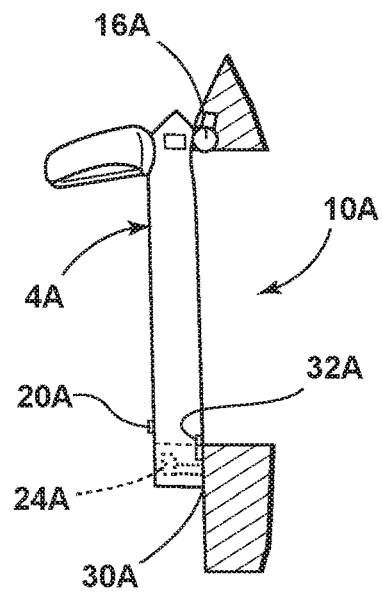
FIG. 6 is a schematic plan view of a vehicle door in a closed position.
Figure 7:
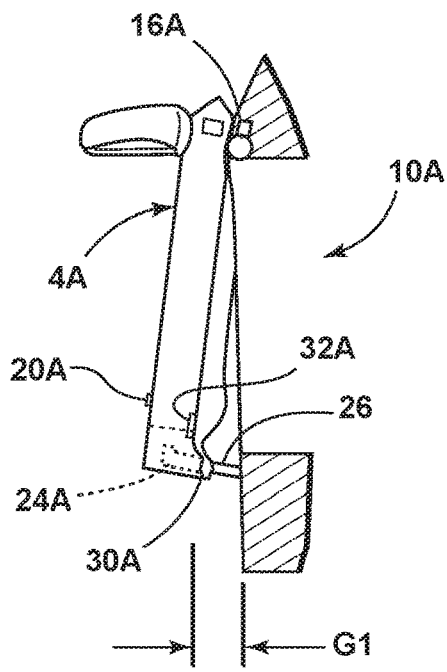
FIG. 7 is a schematic plan view of a vehicle door in a partially open position.
Figure 8:
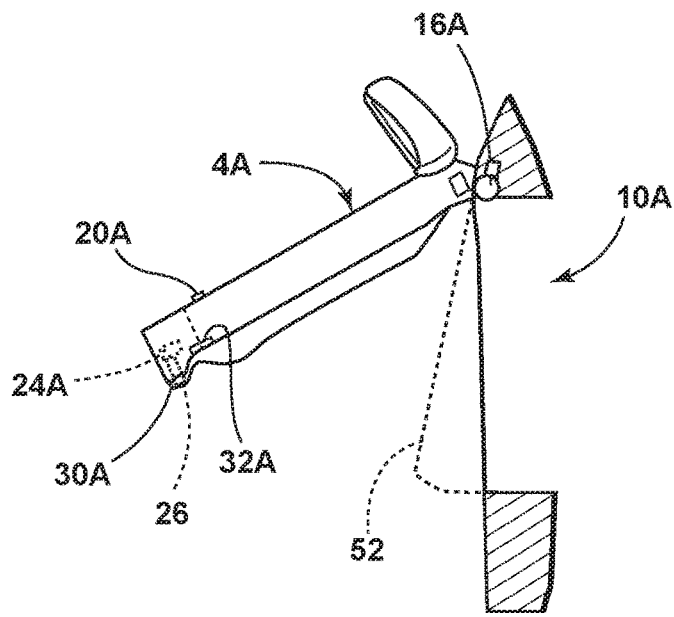
FIG. 8 is a schematic plan view of a vehicle door in a fully open position.

With further reference to FIGS. 6-8, a user initially actuates switch or sensor 20A when door 4A is in a closed position (FIG. 6). Controller 28 then unlatches the powered latch 32A, and actuates powered door opener 24A to extend plunger 26 to a first check (distance P1) position in which door 4A is in a first partially opened position creating a gap G1 as shown in FIG. 7. A user then grasps edge 30A of door 4A and pulls the door to a fully open position shown in FIG. 8. As discussed below, the plunger 26 is retracted while the door 4A is in a fully open position (FIG. 8), and the powered latch 32A is then reset. A user can then push the door 4A from the open position (FIG. 8) to the closed position (FIG. 6), and powered latch 32A retains the door 4A in the fully closed position (FIG. 6). Powered latch 32A may comprise a cinching door latch. For example, the claw 180 of the powered latch described in the U.S. patent application Ser. No. 15/227,672 may be operably connected to a powered actuator (e.g. electric motor) whereby the claw rotates from an open/released position to a latched/closed position to engage a striker to pull the door to a fully-closed position. If the powered latch 32A is a cinching door latch, door 4A may be initially pushed to a mostly closed position 52 (FIG. 8), and the powered latch 32A may then be actuated to shift the door to the fully closed position of FIG. 6. Cinching latch mechanisms are disclosed in U.S. patent application Ser. No. 14/223,444, filed on Mar. 24, 2014 and entitled "ADJUSTABLE LATCH ASSEMBLY," now U.S. Pat. No. 9,004,570, issued on Apr. 14, 2015, and U.S. patent application Ser. No. 14/689,811, filed on Apr. 17, 2015 and entitled "ADJUSTABLE DECKLID LATCH ASSEMBLY," now U.S. Pat. No. 9,951,547, issued on Apr. 24, 2018, the entire contents of each being incorporated herein by reference. Cinching door latches are generally known in the art, and a detailed description of a cinching door latch is therefore not believed to be necessary. It will be understood that all of the doors 4A, 4B, 6A, and 6B of vehicle 1 may operate in substantially the same manner as the doors shown and described above in connection with FIGS. 2-8.

Figure 9:
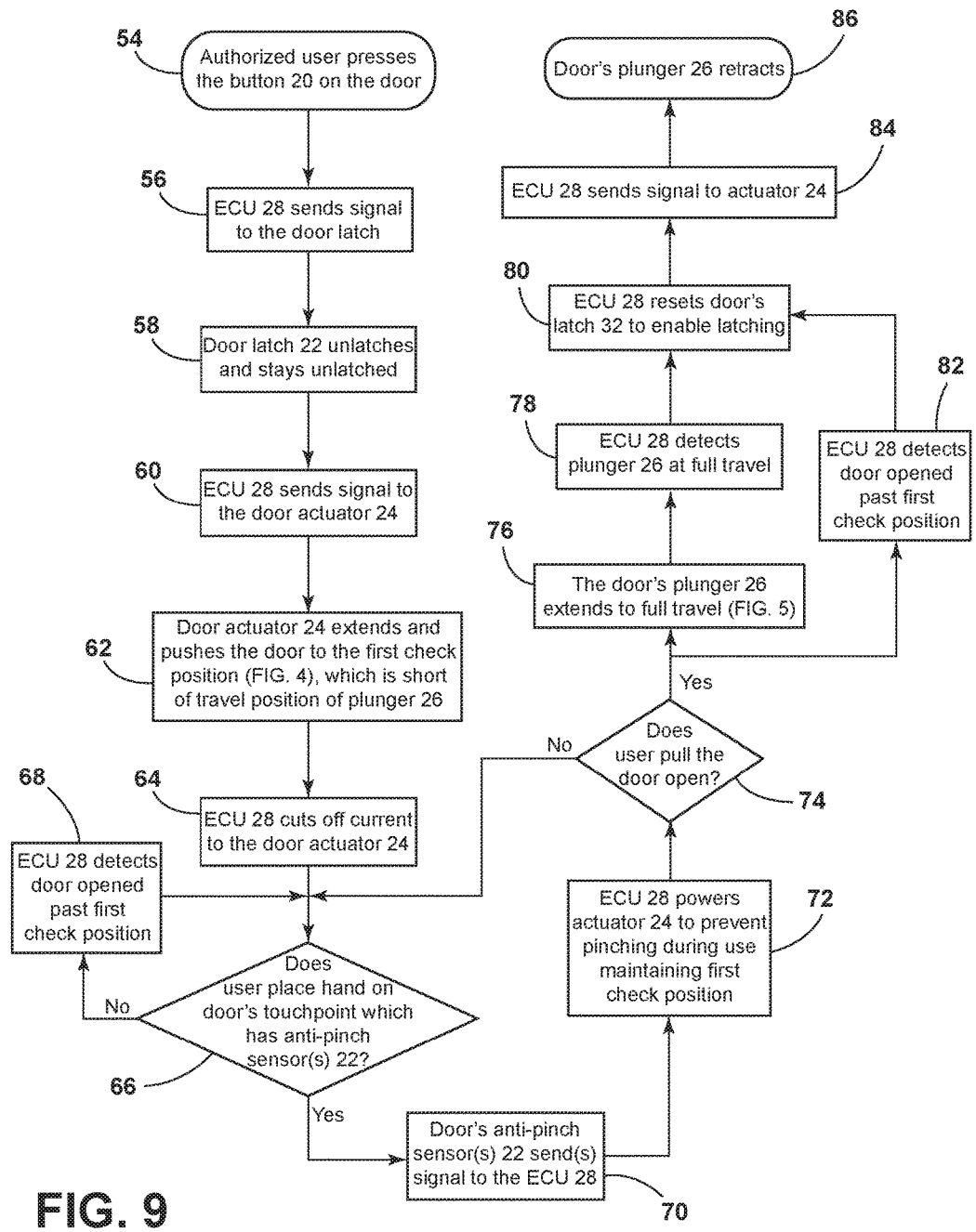
FIG. 9 is a flow chart showing operation of a vehicle including a power release latch and powered door opening actuator with locally controlled anti-pinch door sensors.

Operation of a single vehicle door having a locally controlled anti-pinch door sensor is shown in the flow chart of FIG. 9. The control arrangement of FIG. 9 may be utilized if, for example, vehicle 1 includes only front doors 4A and 4B, such that a pinch situation involving adjacent front and rear doors (e.g. FIG. 3) is not present. In steps 54-62, a user presses or otherwise actuates a sensor or button 20 on the outside of the vehicle door, and the controller/ECU 28 sends a signal to the powered door opening mechanism or actuator 24, and plunger 26 then extends to a first check position 26A (FIG. 4). At step 64, the ECU 28 cuts off electrical current to the door actuator 24. At step 66, the ECU 28 determines if a user's hand is detected by anti-pinch sensors 22. If not, the process continues at step 68, and ECU 28 determines if the door has been opened past the first check position of FIG. 4. At step 66, if a user's hand is detected, the process continues to step 70, and the anti-pinch sensors 22 send a signal to the ECU 28. At step 72, the ECU 28 provides electrical power to the actuator 24 to retain the plunger 26 in a first check position (FIG. 4) and prevent pinching. At step 74, if a user does not pull the door open, the process goes back to step 66 described above. If the user does pull the door open at step 74, the process may optionally continue at step 76 and extend plunger 26 to the full travel position of FIG. 5. The ECU 28 detects that the plunger 26 is in the full travel position (FIG. 5) at step 78, and the ECU 28 determines (i.e. assumes) that the door has been fully opened because the plunger 26 is in the fully extended position, and the process then continues at step 80 and the ECU 28 resets the doors powered latch 32 to enable latching. Alternatively, if the door includes sensors that directly detect that the door has been opened past the first check position as shown at step 82, the process generally proceeds from step 74 to step 82, and then to step 80. After step 80, the ECU 28 sends a signal to the powered door actuator 24 to retract the plunger 26 as shown at step 86. A user can then push on the door to return it to its closed position. Because the plunger 26 is retracted at step 86, the plunger 26 does not in any way interfere with closing of the vehicle door.

Figure 10A:
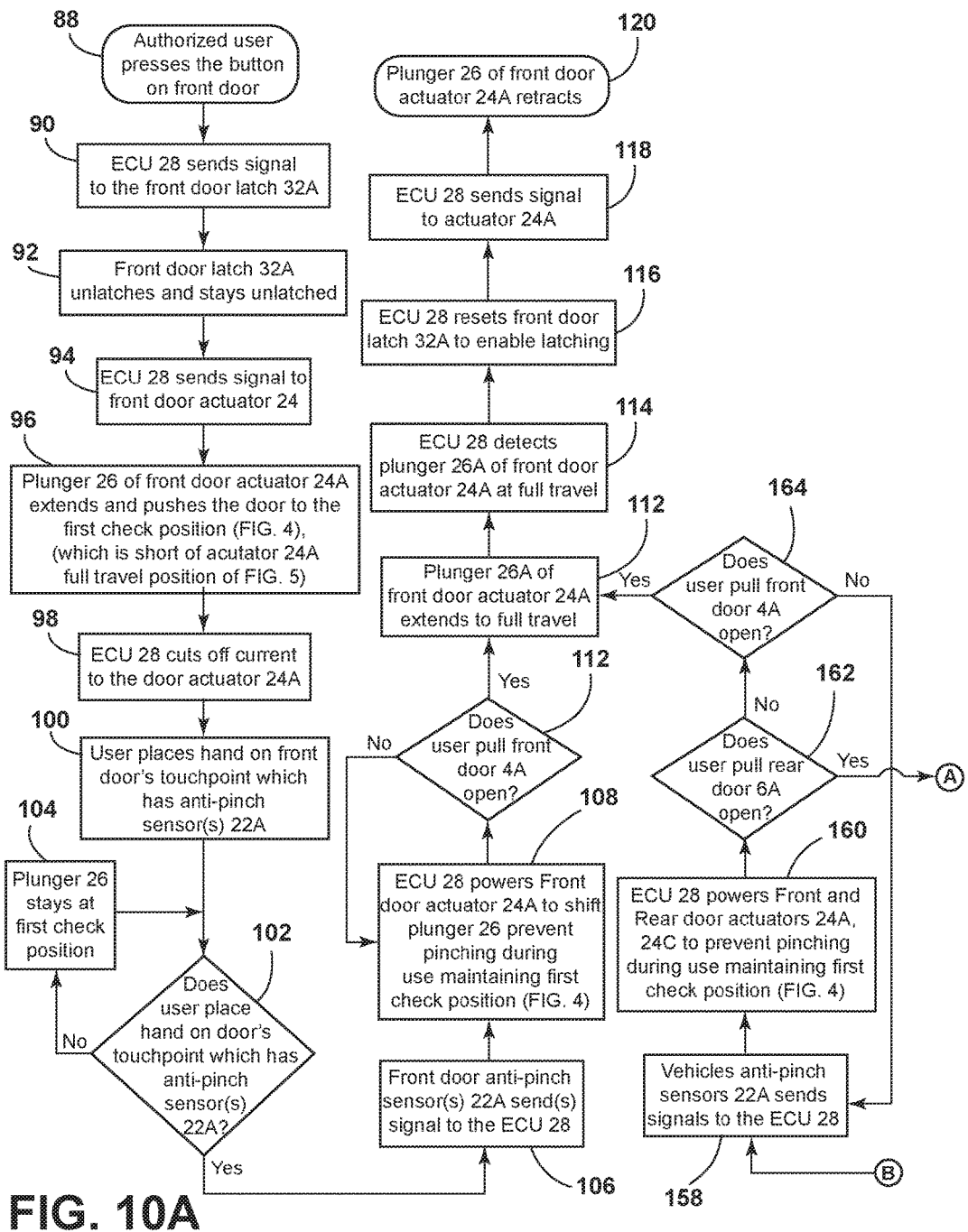
FIG. 10A is a first portion of a flow chart showing operation of a vehicle door system that includes front and rear doors having powered door latches, powered door opening mechanisms and front and rear anti-pinch door sensors.
Figure 10B:
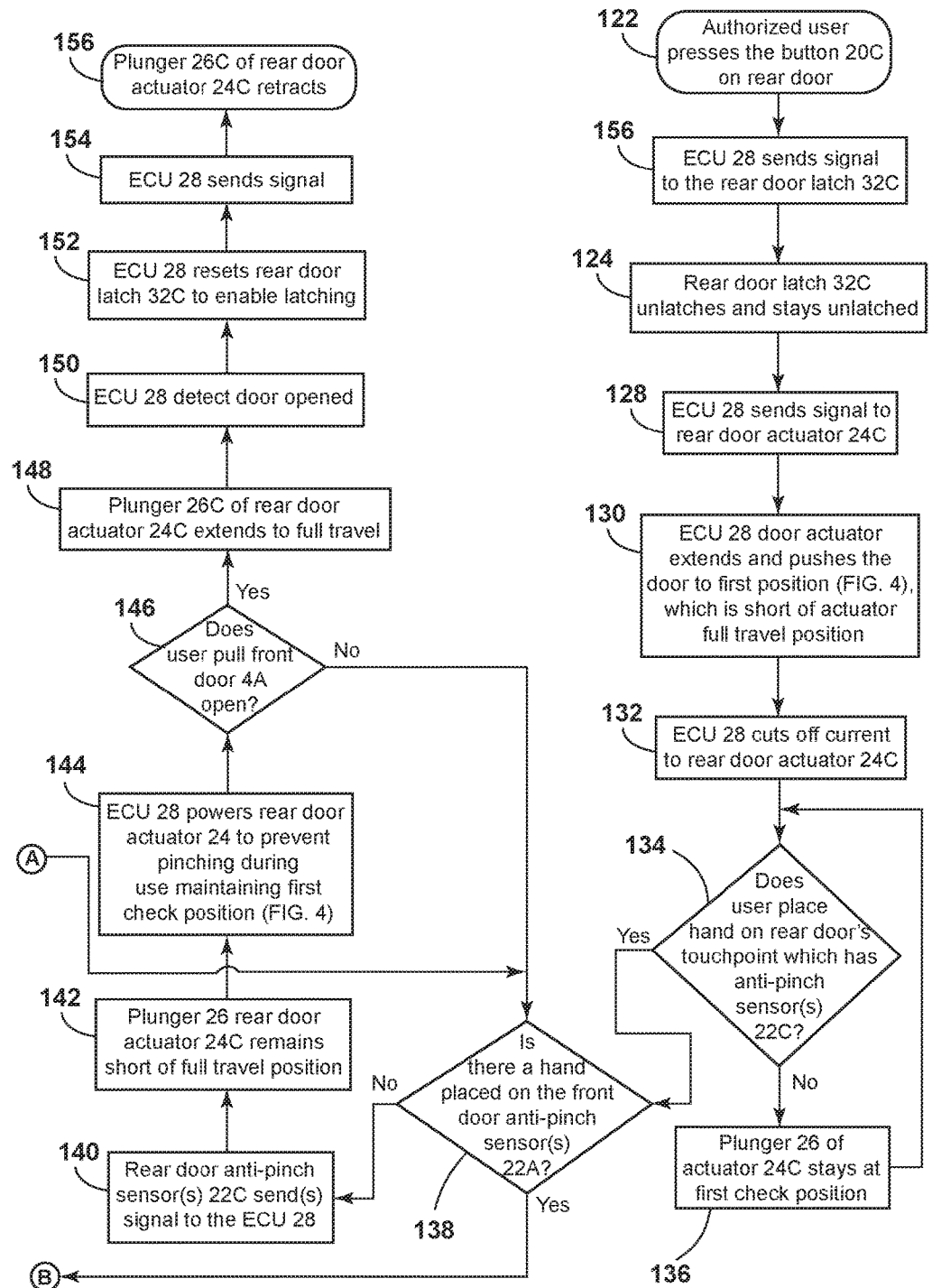
FIG. 10B is a second portion of the flow chart of FIG. 10A; and rear doors having powered door latches, powered door opening mechanisms and front and rear anti-pinch door sensors.

The flow chart of FIGS. 10A and 10B shows operation of a vehicle 1 including adjacent front and rear doors (e.g. FIGS. 2 and 3). Front door operation begins at step 88 (FIG. 10A), and rear door operation begins at step 122 (FIG. 10B). Steps 88-110 of FIG. 10A are substantially similar to steps 54-72 described above in FIG. 9, and steps 122-136 of FIG. 10B are substantially similar to steps 54-66 of FIG. 9. However, if the rear door is opened, and if a hand is detected by the front door anti pinch sensors 22A (step 138; FIG. 10B), the process moves from step 138 to step 158 (FIG. 10A), and the anti-pinch sensor 22A of the front door sends a signal to the ECU 28. At step 160, the ECU 28 then powers both the front and rear door actuators 24A and 24C to maintain the doors in the first check position (FIG. 4) to prevent pinching. At step 162, a user pulls the rear door 6A open, the process continues to step 138 (FIG. 10B). If a user does not pull the rear door open at step 162, the process continues as shown at step 164. At step 112 (optional) the ECU 28 determines that the front door 4A is open because plunger 26A is at full travel (FIG. 5). Similarly, at step 148 (FIG. 10B), if the rear door actuator is at full travel the ECU 28 determines at step 150 that the rear doors opened. It will be understood that the vehicle doors may include sensors that enable ECU 28 to determine if the door is fully opened, such that the ECU 28 does not necessarily need to use full travel of plungers 26 to determine if the door is fully open. After the ECU 28 detects that the front or rear door is fully open, the ECU 28 resets the powered latches and retracts the plungers of the powered door actuators 24A and 24C to permit a user to return the door to a closed position.

Figure 11A:
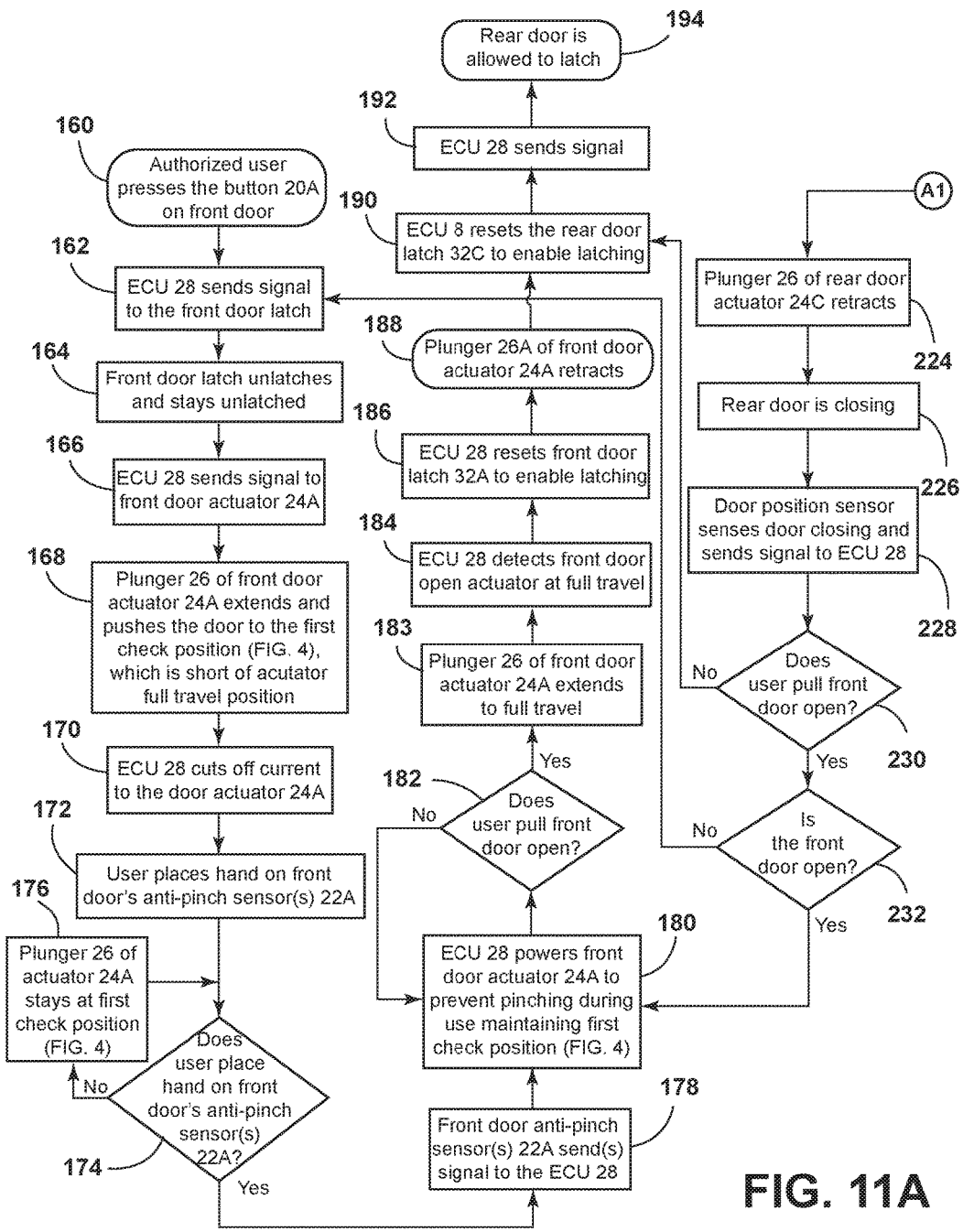
FIG. 11A is a first portion of a flow chart showing vehicle door operation for doors including powered door latches, powered door opening actuators, front and rear anti-pinch sensors, and front and rear door position sensors.
Figure 11B:
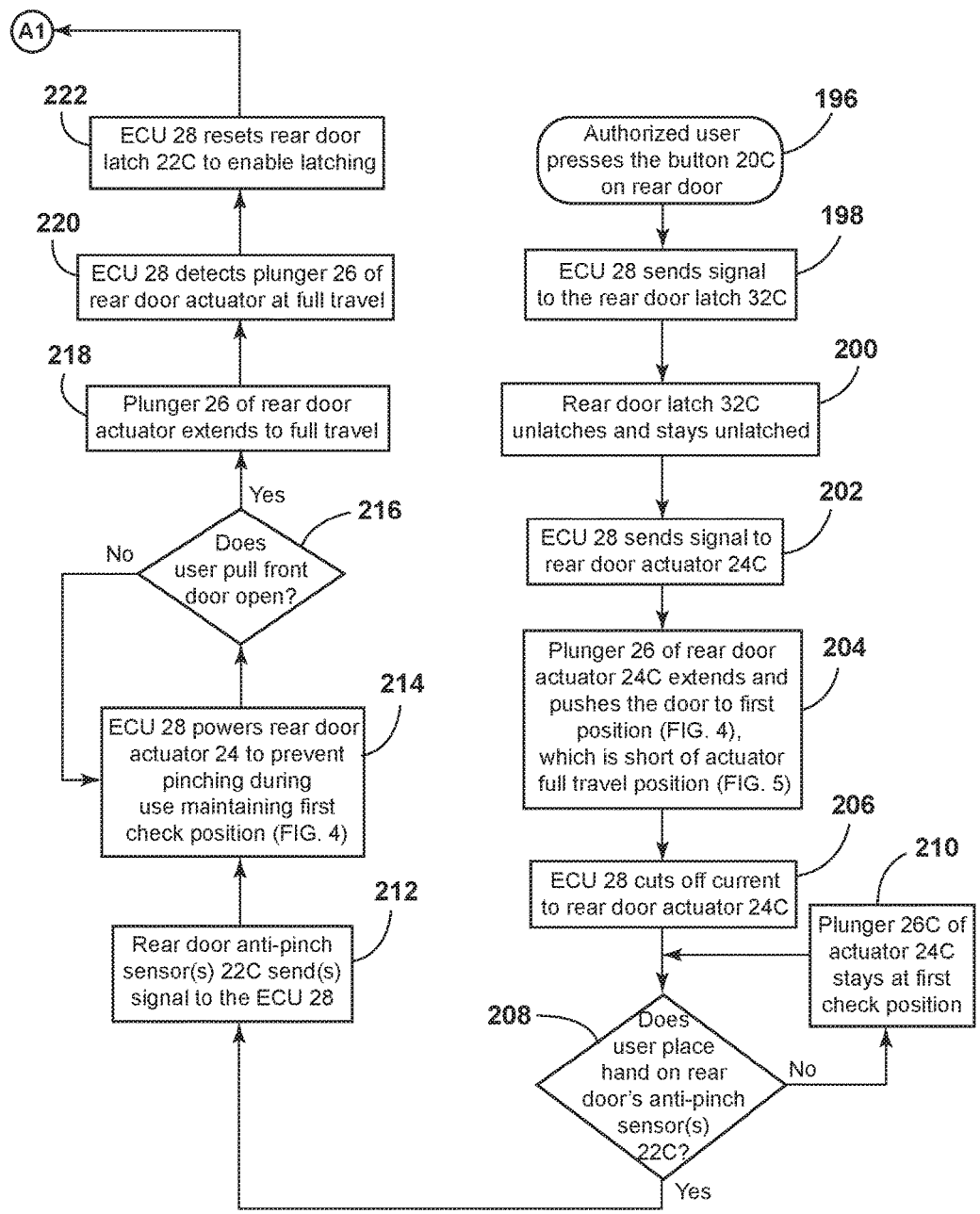
FIG. 11B is a second portion of the flow chart of FIG. 11A.

The flow chart of FIGS. 11A and 11B shows operation of a vehicle 1 including front and rear doors and door position sensors. Operation of the front door generally begins at step 160 (FIG. 11A), and operation of the rear door generally begins at step 196 (FIG. 11B). The door operations of FIGS. 11A and 11B are similar to the operations of FIGS. 10A and 10B, respectively. However, rear door operation further includes determining if the front door is open at step 232 (FIG. 11A). If the front door is not open, the process continues to step 162 as shown in FIG. 11A. Thus, as shown in FIG. 11A if the rear door is closed and the front door is open (Step 232), the ECU 28 unlatches the front door is shown at steps 162 and 164.

Figure 12A:
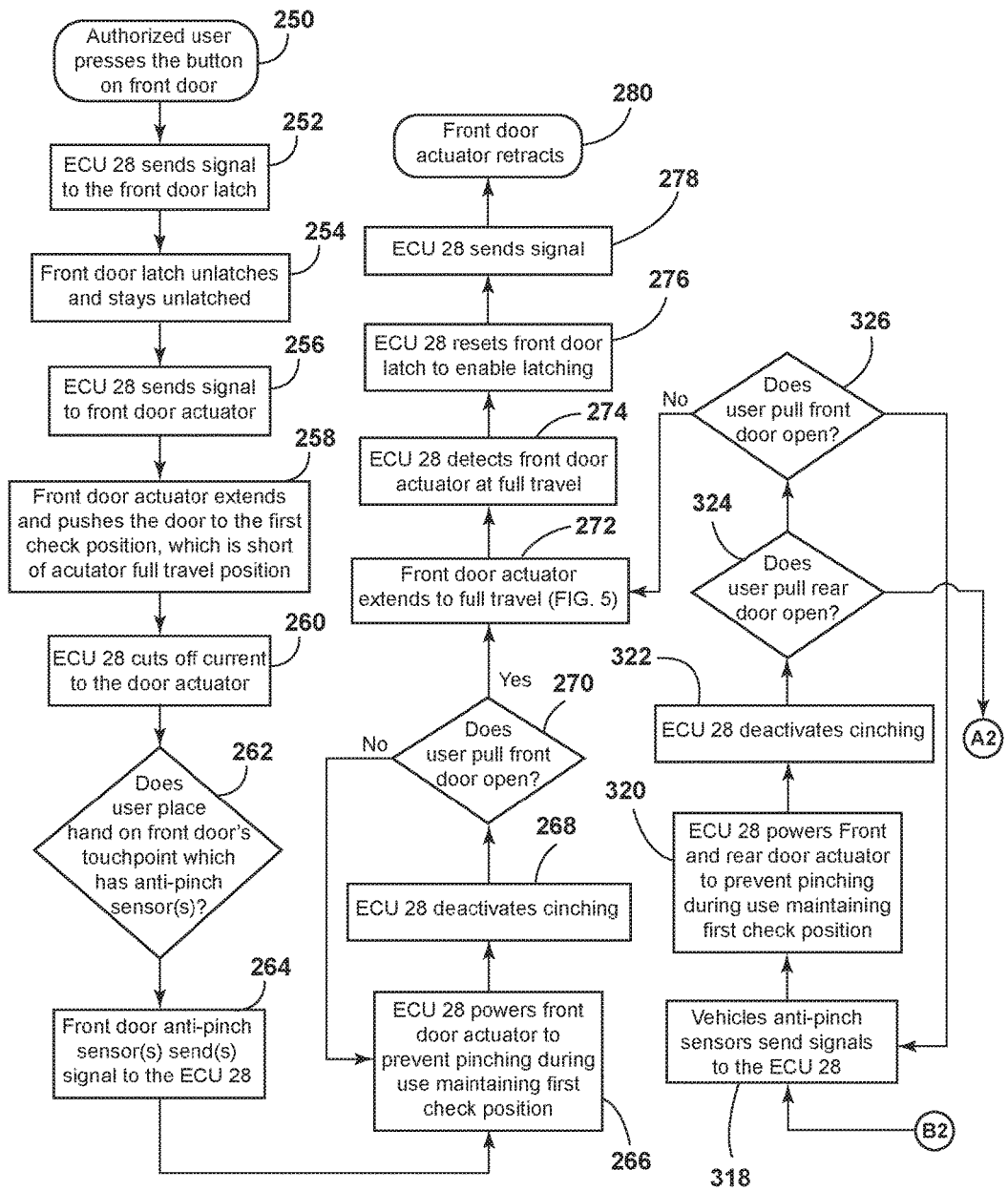
FIG. 12A is a first portion of a flow chart for a door system including powered front and rear door latches, powered front and rear door opening mechanisms, and front and rear anti-pinch door sensors.
Figure 12B:
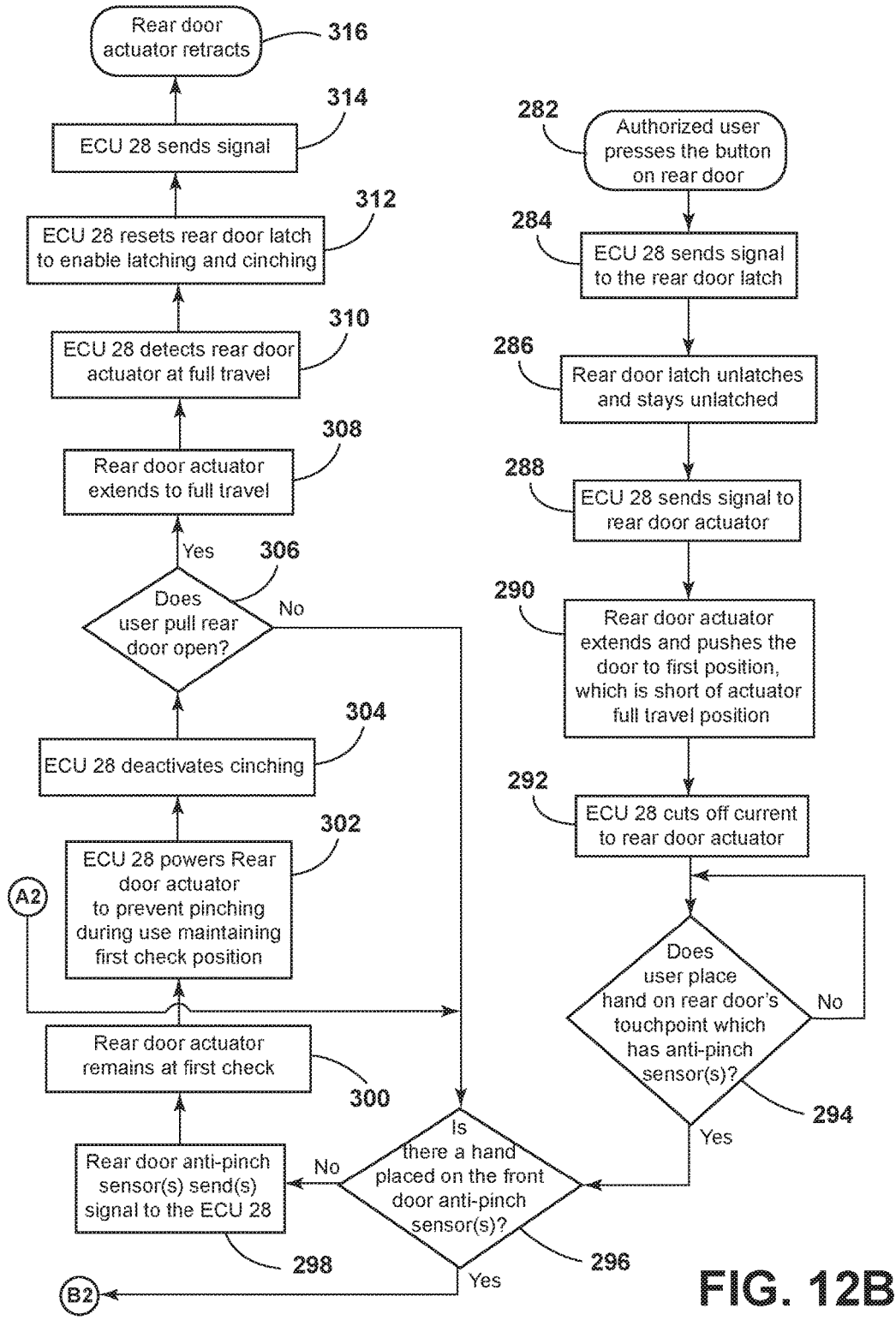
FIG. 12B is a second portion of the flow chart of FIG. 12A.

The flow chart of FIGS. 12A and 12B shows operation of a vehicle including front and rear doors with powered latches 32A and 32C that comprise cinching latches. The operation shown in FIGS. 12A and 12B is generally similar to the vehicle door operations described above. However, in FIGS. 12A and 12B the ECU 28 actuates the cinching sensors as required.

Figure 13A:
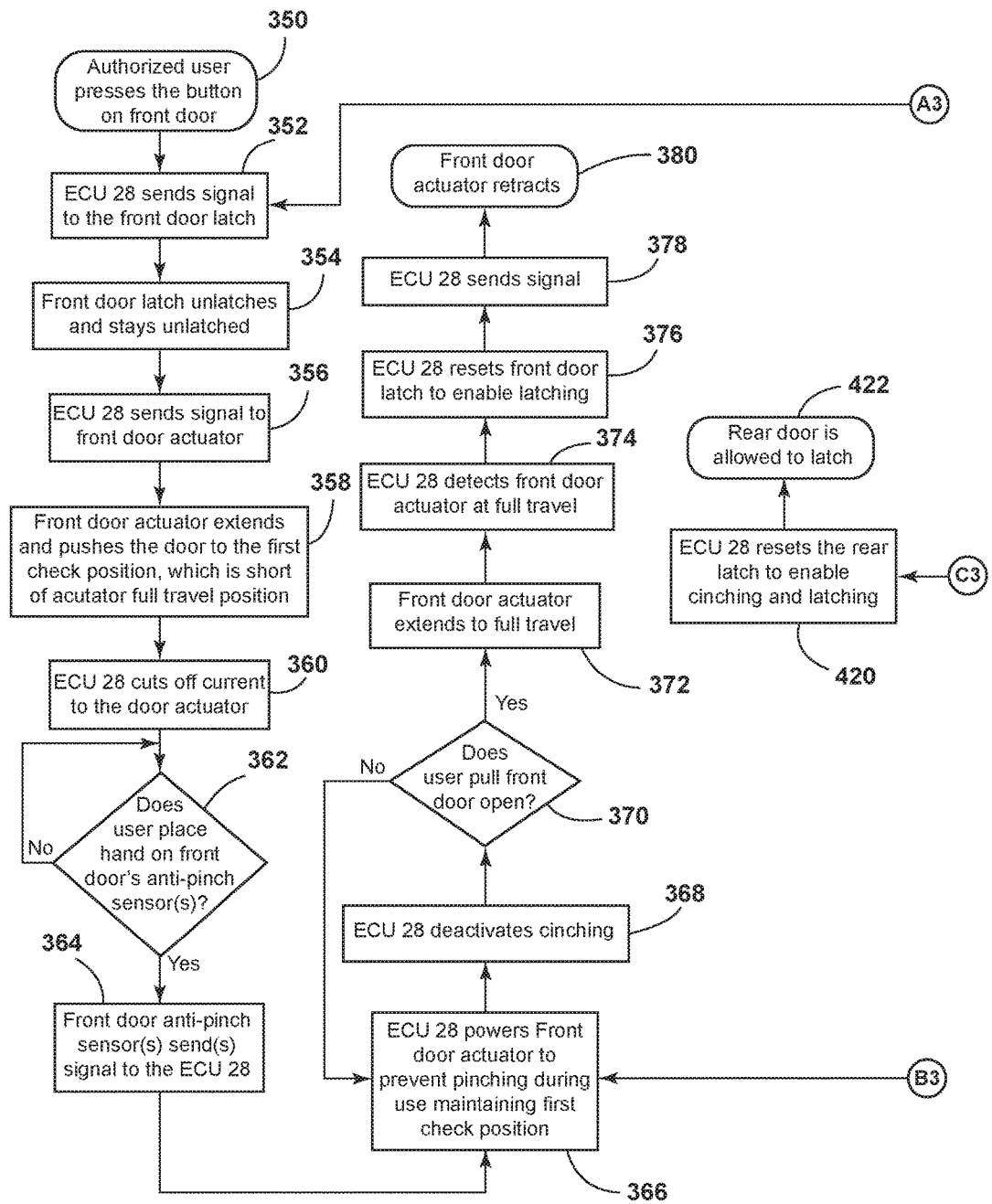
FIG. 13A is a first portion of a flow chart showing operation of a vehicle door system including powered cinching front and rear door latches, powered front and rear door opening actuators, front and rear anti-pinch sensors, and front and rear door position sensors.
Figure 13B:
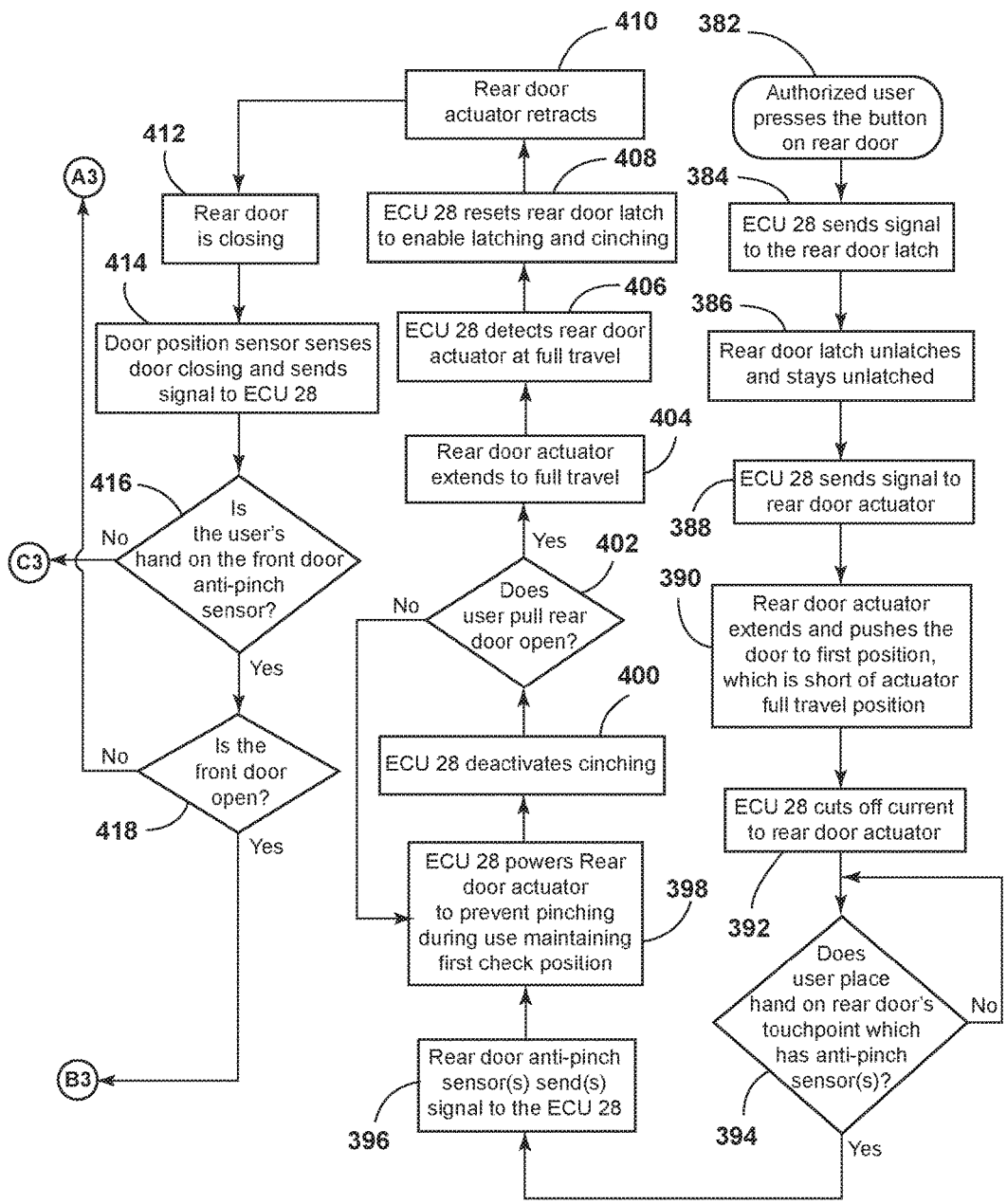
FIG. 13B is a second portion of the flow chart of FIG. 13A.

The flow chart of FIGS. 13A and 13B shows operation of a vehicle including front and rear doors having powered cinching latches, door position sensors, and anti-pinch sensors. The operations shown in FIGS. 13A and 13B are generally similar to the operations discussed above in connection with FIGS. 9, 10A, 10B, 11A and 11B, and 12A and 12B. However, as shown in FIGS. 13A and 13B, if the vehicle includes both cinching latches and door position sensors, the ECU 28 utilizes the door position data to control the cinching latches and/or the powered door opening mechanism.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
a body having a door opening:
a door rotatably mounted to the body to close off the door opening when the door is in a closed position;
an anti-pinch sensor that is configured to detect a user's hand if a user's hand is positioned adjacent the door opening and/or adjacent an edge of the door;
an electrically-powered latch mechanism configured to permit the door to open when the electrically-powered latch mechanism is unlatched, wherein the electrically-powered latch mechanism is configured to retain the door in a closed position when the electrically-powered latch mechanism is latched;
an electrically-powered door actuator that can be actuated to shift the door from a closed position to a partially open position; and
a controller configured to actuate the electrically-powered door actuator to prevent the door from closing if the anti-pinch sensor detects a user's hand.

2. The vehicle of claim 1, wherein:
the partially open position comprises a first partially open position;
the electrically-powered door actuator can be actuated to shift the door to a second partially open position in which the door is further open than when the door is in the first partially open position.

3. The vehicle of claim 2, wherein:
the electrically-powered door actuator includes a plunger that shifts from a retracted position to first and second extended positions to push the door from a closed position to the first and second partially open positions, respectively;
the controller is configured to cause the plunger to stop at the first extended position only if predefined operation conditions are present.

4. The vehicle of claim 3, wherein:
the controller is configured to retract the plunger to the retracted position when the door is open only if the anti-pinch sensor does not detect a user's hand.

5. The vehicle of claim 4, wherein:
the controller is configured to reset the electrically-powered latch mechanism to enable the electrically-powered latch mechanism to latch when the controller detects that the plunger of the electrically-powered door actuator has shifted to the second extended position.

6. The vehicle of claim 1, wherein:
the body includes front and rear door openings;
the door comprises a front door that closes off the front door opening when the front door is closed;
the anti-pinch sensor comprises a front anti-pinch sensor;
the electrically-powered door actuator comprises a front electrically-powered door actuator; and including:
a rear door rotatably mounted to the body to close off the rear door opening when the rear door is closed;
a rear anti-pinch sensor;
an electrically-powered rear latch mechanism that retains the rear door in a closed position when the electrically-powered rear latch mechanism is latched;
a rear electrically-powered door actuator including a plunger that shifts from a retracted position to an extended position to push the rear door to an open position; and wherein:
the controller is configured to actuate the rear electrically-powered door actuator to cause the plunger of the rear electrically-powered door actuator to remain in the extended position if the front anti-pinch sensor detects a user's hand.

7. The vehicle of claim 6, wherein:
the front and rear electrically-powered latch mechanisms comprise powered cinching latches that can be actuated to shift the front and rear doors to fully closed positions; and
the controller is configured to prevent cinching of the front electrically-powered latch mechanism if the front anti-pinch sensor detects a user's hand.

8. The vehicle of claim 7, wherein:
the controller is configured to determine if the front anti-pinch sensor detects a user's hand while the front door is closed, and, if so, the controller causes the front electrically-powered latch mechanism to unlatch.

9. The vehicle of claim 6, wherein:
the front door includes a first unlatch sensor on an outer side of the front door;
the rear door includes a second unlatch sensor on an outer side of the rear door;
the controller is configured to unlatch the front electrically-powered latch mechanism if the first unlatch sensor is actuated by a user; and the controller is configured to unlatch the rear electrically-powered latch mechanism if the second unlatch sensor is actuated by a user.

10. The vehicle of claim 6, wherein:
the front door opening includes a rear edge, and the front anti-pinch sensor is located adjacent the rear edge such that a user's hand can actuate the front anti-pinch sensor when the front door is closed and the rear door is open.

* * * * *